United States Patent
Uchino et al.

(10) Patent No.: US 9,439,207 B2
(45) Date of Patent: Sep. 6, 2016

(54) DEVICE AND ANTENNA PICTOGRAM DISPLAY METHOD

(71) Applicant: NTT DOCOMO, INC., Tokyo (JP)

(72) Inventors: Tooru Uchino, Tokyo (JP); Kenichiro Aoyagi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/412,294

(22) PCT Filed: May 31, 2013

(86) PCT No.: PCT/JP2013/065259
§ 371 (c)(1),
(2) Date: Dec. 31, 2014

(87) PCT Pub. No.: WO2014/007009
PCT Pub. Date: Jan. 9, 2014

(65) Prior Publication Data
US 2015/0139114 A1    May 21, 2015

(30) Foreign Application Priority Data

Jul. 6, 2012   (JP) ................................. 2012-152968

(51) Int. Cl.
*H04W 72/08*     (2009.01)
*H04W 24/08*     (2009.01)
*H04M 1/725*     (2006.01)

(52) U.S. Cl.
CPC ....... *H04W 72/085* (2013.01); *H04M 1/72519* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 6,134,445 A * | 10/2000 | Gould | ................... | H04W 24/00 379/433.04 |
| 8,035,390 B2 * | 10/2011 | Olsson | ..................... | G01V 3/15 324/326 |
| 8,098,155 B2 * | 1/2012 | Gloo | ........................ | G01S 5/04 340/539.11 |
| 2004/0070535 A1 * | 4/2004 | Olsson | ..................... | G01S 7/03 342/459 |
| 2007/0287379 A1 * | 12/2007 | Matsuura | ............. | H04B 1/0064 455/39 |
| 2008/0291010 A1 * | 11/2008 | Liao | ................... | G08B 21/0208 340/539.13 |

(Continued)

FOREIGN PATENT DOCUMENTS

| | | |
|---|---|---|
| EP | 2584812 A1 | 4/2013 |
| JP | 2000-261852 A | 9/2000 |

(Continued)

OTHER PUBLICATIONS

International Search Report for corresponding International Application No. PCT/JP2013/065259, mailed Jun. 25, 2013 (3 pages).

(Continued)

*Primary Examiner* — Eunsook Choi
(74) *Attorney, Agent, or Firm* — Osha Liang LLP (57) ABSTRACT

There is disclosed user equipment including a communication unit for executing carrier aggregation and for executing communication through a plurality of carriers, and an antenna pictogram display unit for displaying, through an antenna pictogram, at least whether communication is allowed. When execution of the carrier aggregation is allowed, the antenna pictogram display unit displays an indication that the execution of the carrier aggregation is allowed together with at least one antenna pictogram.

4 Claims, 7 Drawing Sheets

(56) References Cited

U.S. PATENT DOCUMENTS

| | | | | |
|---|---|---|---|---|
| 2010/0302014 A1* | 12/2010 | Gloo | ............... | G01S 5/04 340/326 |
| 2011/0265028 A1 | 10/2011 | Hong et al. | | |
| 2012/0188878 A1* | 7/2012 | Simon | ............... | H04W 4/06 370/241 |

FOREIGN PATENT DOCUMENTS

| JP | 2001177870 A | 6/2001 |
|---|---|---|
| JP | 2001268185 A | 9/2001 |
| JP | 2005-123717 A | 5/2005 |
| JP | 2005295516 A | 10/2005 |
| JP | 2010278707 A | 12/2010 |
| JP | 2012-5084 A | 1/2012 |

OTHER PUBLICATIONS

Written Opinion for corresponding International Application No. PCT/JP2013/065259, mailed Jun. 25, 2013 (3 pages).

3GPP TS 36.300 V10.7.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Mar. 2012 (194 pages).

Extended European Search Report in counterpart European Patent Application No. 13813799.7, dated Feb. 3, 2016 (7 pages).

Notification of Reasons for Refusal issued in the counterpart Japanese Patent Application No. 2012-152968, mailed Feb. 16, 2016 (5 pages).

NEC KASHIOBAIRU Communications, Inc.; "N-02D and docomo STYLE series, N-02D an operation manual, NTT DoCoMo, Inc."; pp. 25-29, 412; Nov. 2011 (12 pages).

* cited by examiner

DEVICE AND ANTENNA PICTOGRAM DISPLAY METHOD

TECHNICAL FIELD

The disclosed invention relates to user equipment and an antenna pictogram display method.

BACKGROUND ART

Figure 1:
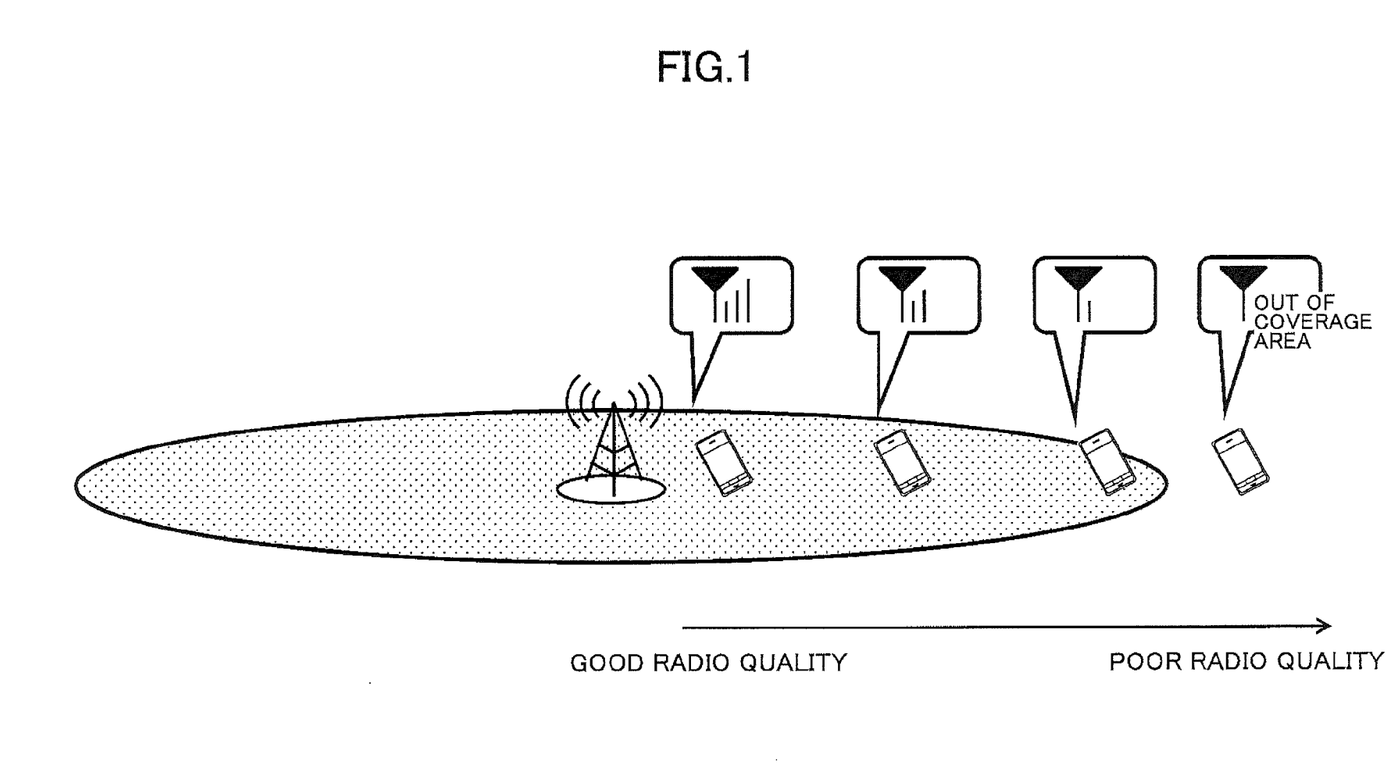
FIG. 1 is a diagram illustrating a situation in which it is displayed, together with an antenna pictogram, whether a communication state of user equipment is good or not.

In a communications system, user equipment may display, together with an antenna pictogram, as to whether a communication state is good or not, as shown in FIG. 1. This allows a user to know whether a communication state is good or not as well as whether the user is within a coverage area or out of a coverage area.

In an LTE-Advanced communications system, communications can be executed by using one or more carriers. It can be referred to as "carrier aggregation (CA)" to execute communications by using a plurality of carriers. For executing the CA, a cell that is relatively reliable may be set to be a primary cell (P-cell), and one or more other cells may be set to be secondary cells (S-cells). Non-Patent Document 1 discloses CA in related art.

RELATED ART DOCUMENT

Non-Patent Document

3GPP TS36.300 V10.7.0(2012-03)

SUMMARY OF THE INVENTION

Problem to be Solved by the Invention

An object of the disclosed invention is to allow a heavy user to be guided to a cell in which high-speed communications can be achieved by carrier aggregation (CA).

Means for Solving the Problem

According to an embodiment of the disclosed invention, there is provided user equipment including a communication unit configured to execute carrier aggregation (CA) and configured to execute communication through a plurality of carriers; and an antenna pictogram display unit configured to display, through an antenna pictogram, at least whether communication is allowed; wherein, when the CA is allowed, the antenna-pictogram display unit is configured to display an indication that the CA is allowed together with at least one antenna pictogram.

According to another embodiment of the present invention, there is provided an antenna pictogram display method that is to be executed by user equipment configured to execute carrier aggregation (CA) and configured to execute communication through a plurality of carriers. The method includes a step of displaying, when the CA is allowed, an indication that the CA is allowed together with at least one antenna pictogram.

Effect of the Present Invention

According to the disclosed invention, a heavy user can be properly guided to a cell in which high-speed communications can be achieved by the CA.

EMBODIMENTS FOR CARRYING OUT THE INVENTION

In a location or an area in which carrier aggregation is allowed, high-speed and high-capacity communications can be executed, so that it is suitable for a "heavy user" to execute communication. However, as shown in FIG. 1, for related art, a user may not determine whether the user is located within a coverage area in which the carrier aggregation is allowed. Because of this, the user may miss an opportunity for communication by the carrier aggregation, even if the user is within a location that is suitable for high-speed communications. Conversely, the heavy user may attempt to execute high-speed communication in a location in which the carrier aggregation is disallowed. These situations are not desirable from the perspective of effectively utilizing radio resources.

An embodiment is explained from the following perspectives, while referring to the accompanying drawings. In the drawings, the similar elements are denoted by the same reference numeral or the same reference symbol.

1. Communications system
2. User equipment
3. Operation example

The separations of the items are not essential to the present invention. Depending on necessity, subject matter described in two or more items may be combined and used, and subject matter described in an item may be applied to subject matter described in another item (provided that they do not contradict).

1. Communications System

Figure 2:
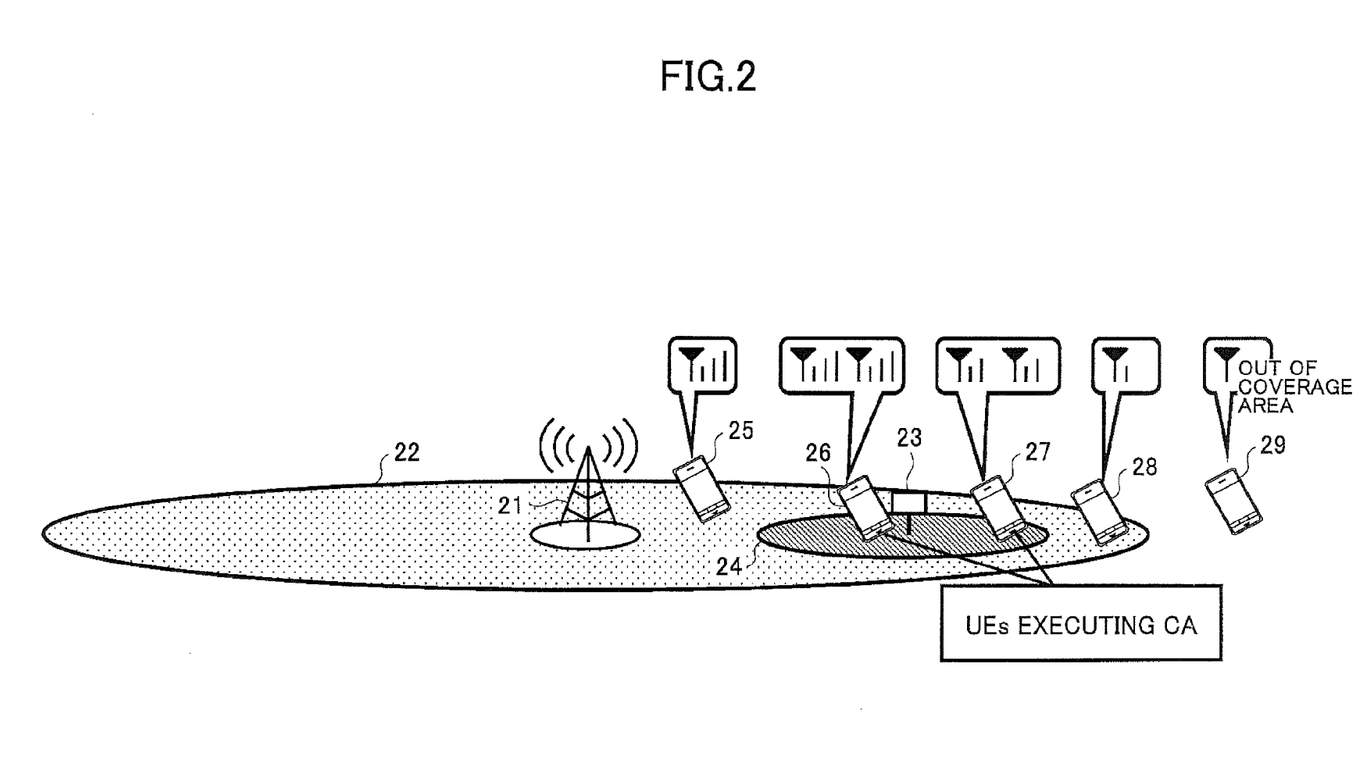
FIG. 2 is a diagram showing a communications system that can be used in an embodiment.

FIG. 2 shows an LTE-Advanced communications system that is used in the embodiment. The communications system includes a macro base station (eNB) 21; a macro cell 22 that is controlled by the macro base station (eNB) 21; a pico base station 23 that is located within the macro cell 22; and a pico cell 24 that is controlled by the pico base station 23. The reference numerals 25 to 29 indicate user equipment (UE). The reference numerals 25 to 29 may indicate a situation in which the same user equipment moves depending on time. Alternatively, the reference numerals 25 to 29 may indicate different units of the user equipment (UE). The number and the large/small relationship of the macro base station (eNB), the pico base station, the macro cell, and the pico cell are for exemplifying purpose only, and any suitable number and large/small relationship may be adopted.

In the depicted communications system, the user equipment (UE) can communicate using one or more carriers. Each of the carriers are referred to as a "component carrier (CC)." In the depicted example, a frequency of a CC of the macro cell 22 is $f_1$, and a frequency of a CC of the pico cell 24 is $f_2$. It can be referred to as "carrier aggregation (CA)" to execute communications using a plurality of carriers. For executing the CA, a cell of a component carrier (CC) that is relatively reliable may be set to be a primary cell (P-Cell), and a cell (or cells) of the other component carrier (CC) (or component carriers (CCs)) may be set to be a secondary call (or secondary cells (S-Cells)). For executing the CA, it may be required that, in addition to that the cells of the plurality of the CCs are regionally overlapped, each of the cells be able to execute a communication process of the CA. In other words, a combination of the CCs or the cells with which the CA can be executed is predefined. For the depicted example, the CA can be executed by the macro cell 22 and the pico cell 24.

Figure 3:
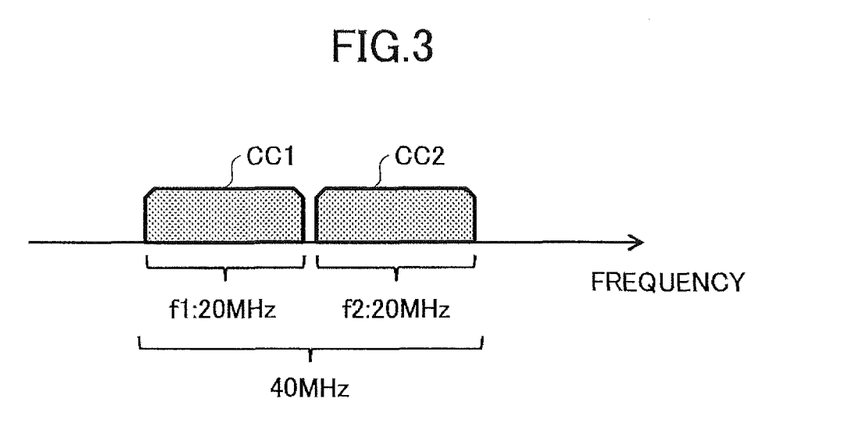
FIG. 3 is a diagram showing an example in which carrier aggregation (CA) is executed.

FIG. 3 shows a situation in which the carrier aggregation (CA) is executed by using a component carrier CC1 of a first system that has a system bandwidth of 20 MHz and a component carrier CC2 of a second system that has a system bandwidth of 20 MHz that is adjacent to the CC1. In this case, communications can be executed by using a bandwidth of 40 MHz in total owing to the CC1 and CC2.

Figure 4:
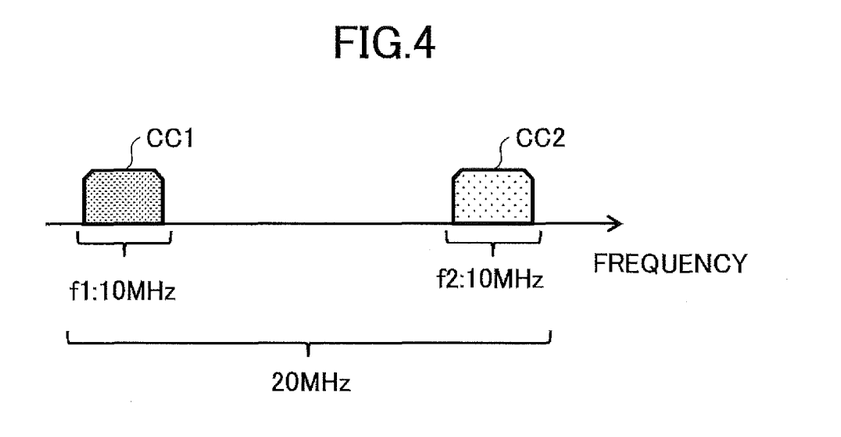
FIG. 4 is a diagram showing another example in which the carrier aggregation (CA) is executed.

FIG. 4 shows a situation in which the carrier aggregation (CA) is executed by using a component carrier CC1 of a first system that has a system bandwidth of 10 MHz and a component carrier CC2 of a second system that has a system bandwidth of 10 MHz that is separated from the CC1. In this case, communications can be executed by using a bandwidth of 20 MHz in total owing to the CC1 and CC2.

The antenna pictograms and the like that are displayed on the units of the user equipment 25-29 are explained below.

2. User Equipment

Figure 5:
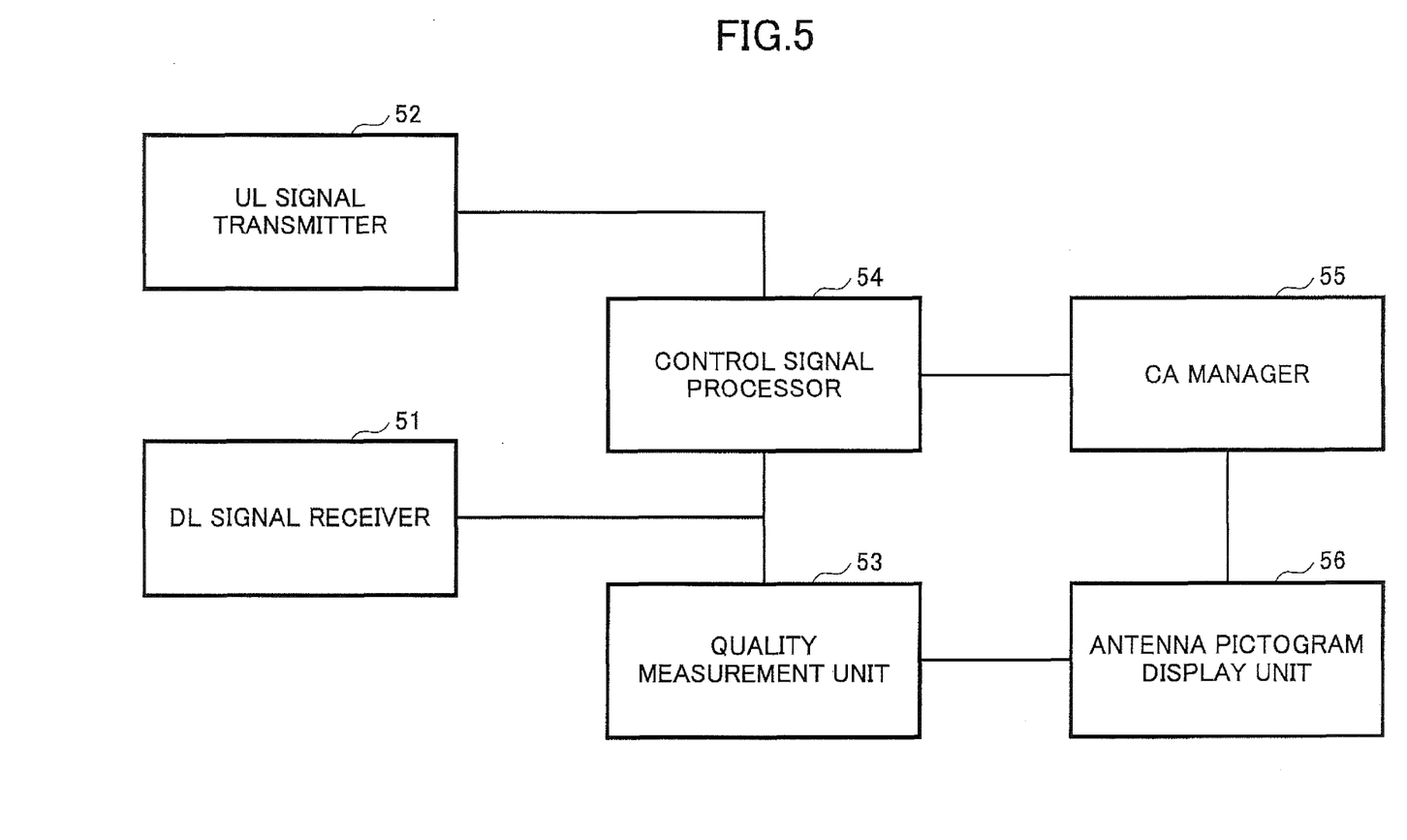
FIG. 5 is a functional block diagram of user equipment.

FIG. 5 shows user equipment that can be used as each of the units of the user equipment 25 to 29 that are shown in FIG. 2. FIG. 5 shows functional units or processing units that are particularly relevant to the embodiment, among various functional units or processing units that are included in the user equipment. Typically, the user equipment can be a cellular phone. However, the user equipment can be another device. Specific examples of the user equipment may be a mobile phone, an information terminal, an advanced mobile phone, a smartphone, a tablet computer, a personal digital assistant (PDA), a mobile personal computer, a palm-top computer, a laptop computer, and so forth. However, the user equipment is not limited to these. The user equipment includes, at least, a. DL signal receiver 51; a UL signal transmitter 52; a quality measurement unit 53; a control signal processor 54; a CA manager 55; and an antenna pictogram display unit 56.

The DL signal receiver 51 may execute a process for receiving a downlink signal that is transmitted from a base station. A downlink signal may include a control signal, a data signal, a reference signal, and a synchronization signal, for example.

The UL signal transmitter 52 may execute a process for transmitting an uplink signal that is to be transmitted to a base station. With the DL signal receiver 51 and the UL signal transmitter 52, the user equipment can execute communication by using one or more carriers (by the CA).

The quality measurement unit 53 can measure quality or a reception level based on a reference signal that is included in a downlink signal. The quality or reception level may be measured by any suitable quantity that is known in this technical field. For example, the quality or reception level may be represented by a received signal strength indicator (RSSI), a signal-to-interference ratio (SIR), a signal-to-interference-plus-noise ratio (SINR), Eb/No, CQI, CNR, CIR, and so forth. However, the quality and reception level are not limited to these.

The control signal processor 54 can execute a process based on a control signal that is received from a base station. For the embodiment, especially, control signals for executing the carrier aggregation (CA) are transmitted and/or received.

The CA manager 55 can execute, for a plurality of cells that is managed by a base station, control or management that is related to the carrier aggregation (CA). For example, the CA manager 55 may manage as to whether the user equipment is executing carrier aggregation (CA), and when it is executed, the CA manager 55 may manage as to which cell is the P-cell and which cell is the S-cell.

The antenna pictogram display unit 56 can display at least one antenna pictogram together with whether communications are allowed or not. The antenna pictogram may be a visual representation, such as an antenna mark, an icon, a pictogram, and so forth. When the CA is allowed, the antenna pictogram display unit 56 can display at least one antenna pictogram together with an indication that the CA is allowed. The antenna pictogram display unit 56 may occupy a part of a visual display unit. The display unit may be, for example, a display, a control panel with a keypad, a cathode ray tube (CRT), a liquid crystal display (LCD), an organic EL panel, or a touch screen. However, the display unit is not limited to these. The display unit in this embodiment is covered with a touch-sensitive transparent panel, so that the display unit can detect motion of a finger of a user for controlling operation of the user equipment.

Figure 6:
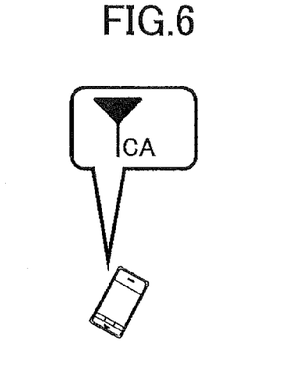
FIG. 6 is a diagram illustrating an example in which there are displayed an antenna pictogram and a fact that the CA is allowed.
Figure 7:
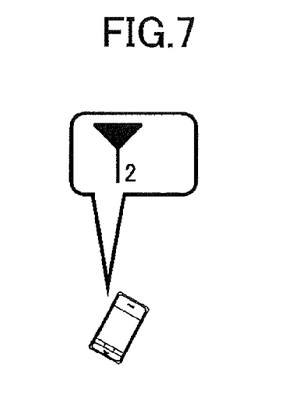
FIG. 7 is a diagram illustrating an example in which there are displayed an antenna pictogram and a number of carriers with which the CA can be executed.
Figure 8:
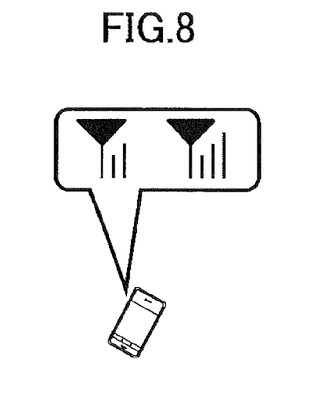
FIG. 8 is a diagram showing an example in which an antenna pictogram and a reception level are displayed for each of a plurality of cells with which the CA can be executed.

For example, when the CA is allowed, the antenna pictogram display unit 56 may display one antenna pictogram, and a character or a symbol that indicates that the CA is allowed (FIG. 6). When the CA is disallowed, neither character nor symbol is displayed that indicates that the CA is allowed. For example, when the CA is allowed, the antenna pictogram display unit 56 may display one antenna pictogram and a number of carriers with which the CA can be executed (FIG. 7). Alternatively, when the CA is allowed, the antenna pictogram display unit 56 may display, for each of a plurality of cells with which the CA can be executed, an antenna pictogram and a reception level (FIG. 8). For the example that is shown in FIG. 8, there are shown an indication at the left side that includes a quality level (that is shown by two vertical lines that are slightly different in length) and one antenna pictogram, and an indication at the left side that includes a quality level (that is shown by three vertical lines that are slightly different in length) and one antenna pictogram. One of them is an indication for the macro cell, and the other is an indication for the pico cell. The two indications correspond to the P-cell and S-cell, respectively. Here, the number of the vertical lines indicates whether the reception level is good or not. The greater the number is, the better the reception level becomes.

The specific methods of indication that are shown in FIGS. 6-8 are for exemplifying purpose only, and any indication may be used that shows at least one antenna pictogram together with an indication that the CA is allowed. For example, in the examples that are shown in FIGS. 7 and 8, respectively, the targets of the CA are two cells. However, the disclosed invention can be applied to a case in which the targets of the CA are more than two cells. In the example of FIG. 7, when the targets of the CA are three cells, the number that is "3" may be displayed adjacent to the antenna pictogram. In the example that is shown in FIG. 8, three indications may be displayed, each of which indicates the antenna pictogram and the quality level. Alternatively, a maximum throughput may be displayed that is theoretically possible in a current radio environment in which the user equipment (UE) is located. Alternatively, the indication of the antenna pictogram may be displayed by considering information of a base station (a degree of congestion or a processing capability of the apparatus) to which the user equipment (UE) is connected. Alternatively, it can be displayed by considering a frequency that the user equipment (UE) is instructed to execute the UL transmission and/or the DL reception by the base station, and a size of assigned data. Alternatively, a processing capability of a radio function unit of the user equipment (UE) may be considered. Alternatively, the indication of the antenna pictogram may be displayed by considering, in addition to radio quality of the same radio access technology (RAT), radio quality of a different RAT. Alternatively, it may be displayed by considering, in addition to quality of a signal from the base station, quality of a signal from different user equipment (UE). Additionally, the indication of the antenna pictogram may be updated periodically or non-periodically.

3. Operation Example

Figure 9:
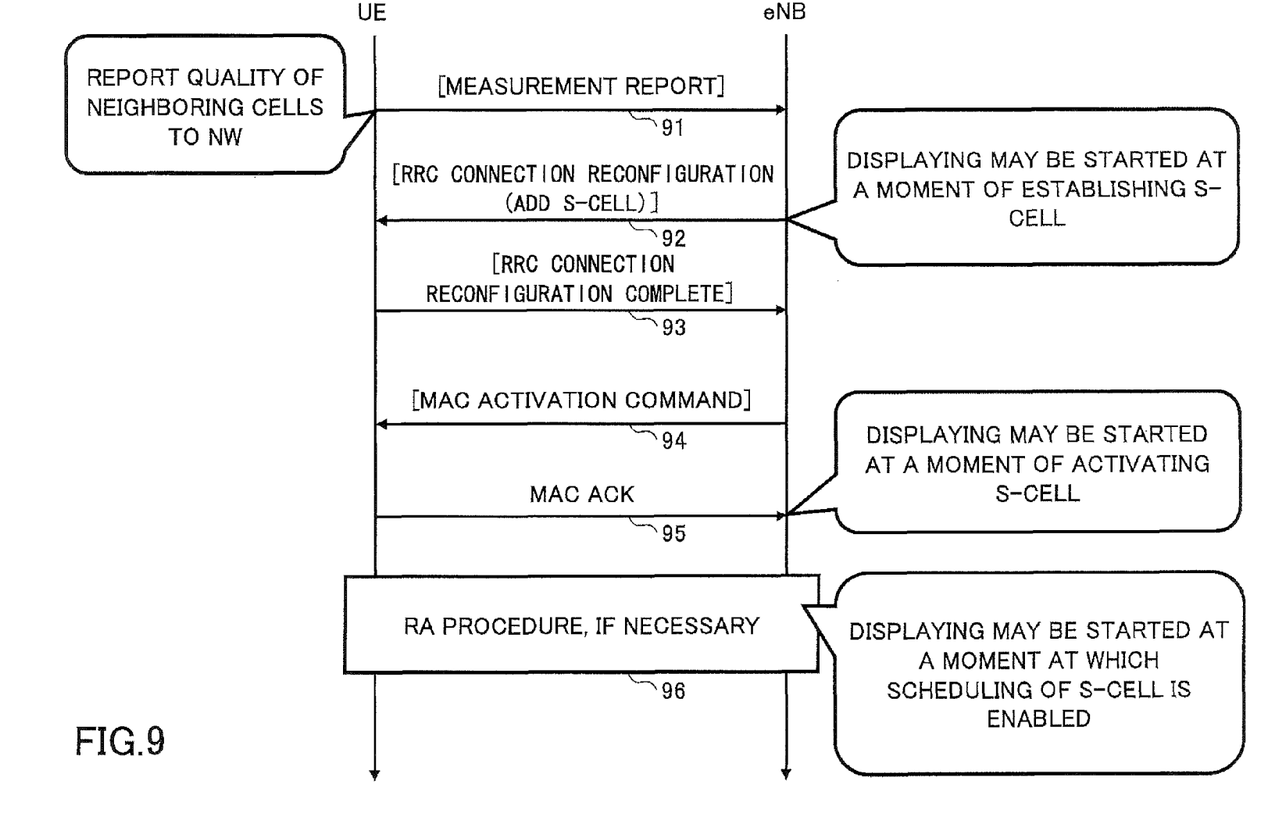
FIG. 9 is a diagram showing a process until user equipment (UE) displays the fact that the CA is allowed.

FIG. 9 shows a process for user equipment (UE) until display of the fact that the CA is allowed. First, it is assumed that, in a state in which the CA is not executed, the user equipment (UE) is served by some cell. That may be the case in which the user equipment (UE) is located at a position of the user equipment 25 in the communications system of FIG. 2, for example. Suppose that, subsequently, the user equipment (UE) moves to a position of the user equipment 26 or 27 of the communications system of FIG. 2.

At step 91, the user equipment (UE) executes a cell search for the serving cell and the neighboring cells, and the user equipment (UE) repots the quality of each cell to the base station (eNB) as a measurement report. In this case, the quality of the macro cell 22 and the quality of the pico cell 24 are reported to the base station (eNB) by the measurement report. The base station (eNB) that receives the report determines, for the user equipment (UE), that carrier aggregation (CA) is allowed in which targets are the macro cell 22 and the pico cell 24. Additionally, a determination is made as to which is the P-cell and which is the S-cell.

At step 92, the base station (eNB) transmits an RRC connection reconfiguration message to the user equipment (UE). This is a report that the CA is allowed whose targets are the macro cell 24 and the pico cell 24. It is also reported as to which is the P-cell and which is the S-cell. In response to this message, the user equipment (UE) sets at the CA manager 55 that the P-cell and the S-cell are subject to the CA.

At step 93, the user equipment (UE) transmits an RRC connection reconfiguration complete message to the base station (eNB). At this step, the user equipment (UE) is not yet allowed to communicate by the CA, and only a confirmation is made that the CA can be allowed by a subsequent procedure and a preparation is made. As an example, at this step in which the S-cell is added, any of FIGS. 6-8 may be displayed on the display unit of the user equipment (UE).

At step 94, the base station (eNB) transmits a MAC activation command to the user equipment (UE). Specifically, it is reported to the user equipment (UE) that the S-cell is actually to be used for communications.

At step 95, the user equipment (UE) transmits a MAC ACK to the base station (eNB). By doing this, the user equipment (UE) is actually allowed to communicate by the CA. As shown in steps 94 and 95, addition (activation) and deletion (deactivation) of the S-cell can be executed by a MAC control element (MAC CE). As an example, any of FIGS. 6-8 may be displayed on the display unit of the user equipment (UE) at the stage of step 95 at which communications by the CA are actually allowed.

At step 96, a random access procedure (RA) may be performed depending on necessity. As an example, any of FIGS. 6-8 may be displayed on the display unit of the user equipment (UE) at this stage.

At any step among step 93, step 94, and step 96, any of FIGS. 6-8 is displayed on the display unit of the user equipment (UE). FIG. 2 shows a situation in which the indication that is shown in FIG. 8 is displayed on the user equipment (UE).

Since the user equipment 25 that is shown in FIG. 2 is close to the macro base station 21, communication quality is high. Because of this, on the user equipment 25, there are displayed a quality level that is shown by three vertical lines that are slightly different in length and one antenna pictogram.

Since the user equipment 26 can execute the CA by the macro cell 22 and the pico cell 24, and the user equipment 26 is close to the macro base station 21 and to the pico base station 23, communication quality is high for any of the cells. Since the CA is allowed, at least, a procedure up to step 93 or up to step 95 that is shown in FIG. 9 is completed. In this case, two indications are displayed on the user equipment 26. Each of the indications includes a quality level that is shown by three vertical lines that are slightly different in length and one antenna pictogram. One is an indication for the macro cell, and the other is an indication for the pico cell.

The user equipment 27 can execute the CA through the macro cell 22 and the pico cell 24. However, since the user equipment 27 is relatively far from the macro base station 21 and from the pico base station 23, communication quality is not high for any of the cells. Since the CA is allowed, at least a procedure up to step 93 or up to step 95 that is shown in FIG. 9 is completed. In this case, two indications are displayed on the user equipment 27. Each of the two indications includes a quality level that is shown by two vertical lines that are slightly different in length and one antenna pictogram. One is an indication for the macro cell, and the other is an indication for the pico cell.

Since the user equipment 28 is located at an edge of the cell that is far from the macro base station 21, communication quality is low. Since the CA is disallowed, a procedure is executed that is for deactivating the S-cell in the CA. In this case, on the user equipment 25, there are displayed a quality level that is shown by one short vertical line and one antenna pictogram.

Since the user equipment 29 is located outside the coverage area, the characters of "out of coverage area" and one antenna pictogram are displayed on the user equipment 29.

Figure 10:
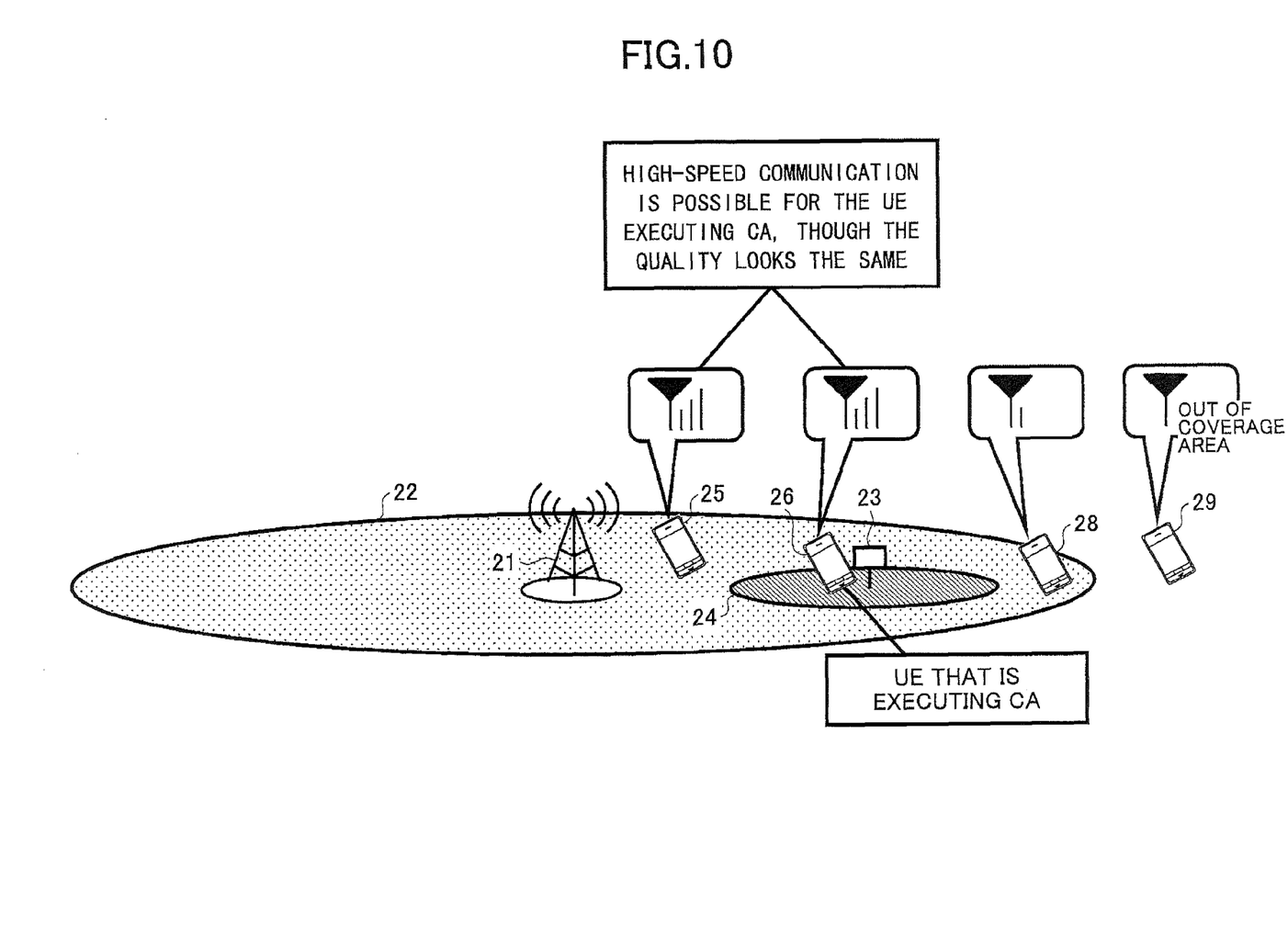
FIG. 10 is a diagram showing a situation in which it is displayed, together with an antenna pictogram, whether a communication state of user equipment is good or not in accordance with a related technique.

For comparison, FIG. 10 shows an indication of an antenna pictogram by a related technique. Comparing the indications of the antenna pictogram that are shown in FIG. 2 and FIG. 10, the indications for the user equipment 25, for the user equipment 28, and for the user equipment 29 are common. However, the indications are different for the user equipment 26 that is located at a position in which the CA is allowed. According to the embodiment, since the characters or symbols that indicate that the CA is allowed are displayed, a user can properly determine whether high-speed communication by the CA is allowed or not. As a result, effective utilization of the resources can be achieved, for example, by guiding a heavy user to a location in which the CA is allowed (e.g., the pico cell), by allowing the high-speed communication while achieving offloading of the macro cell, and by ensuring resources for a general user in the macro cell.

The user equipment and the antenna pictogram display method are explained above by the embodiment in which the fact that the CA is allowed is displayed together with the antenna pictogram. However, the disclosed invention is not limited to the above-described embodiment, and various modifications and improvements can be made within the scope of the present invention. Specific examples of numerical values are used in order to facilitate understanding of the invention. However, these numerical values are simply illustrative, and any other appropriate values may be used, except as indicated otherwise. The separations of the items in the above explanation are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may or may not correspond to a boundary of a physical component. An operation by a plurality of functional units may be physically executed by a single component, or an operation of a single functional unit may be physically executed by a plurality of components. For the convenience of explanation, the communication terminal and the information processing device are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like. The present invention is not limited to the above-described embodiment, and various variations, modifications, alterations, substitutions and so on are included, without departing from the spirit of the present invention.

The present application is based on and claims the benefit of priority of Japanese Patent Application No. 2012-152968, filed on Jul. 6, 2012, the entire contents of Japanese Patent Application No. 2012-152968 are hereby incorporated by reference.

LIST OF REFERENCE SYMBOLS

51: DL signal receiver
52: UL signal transmitter
53: Quality measurement unit
54: control signal processor
55: CA manager
56: Antenna pictogram display unit

The invention claimed is:

1. User equipment comprising:
a processor configured to implement a communication unit that executes communication through a plurality of carriers by executing carrier aggregation, CA, including a primary cell, P-cell, and one or more secondary cells, S-cell; and
an antenna pictogram display unit configured to display, through an antenna pictogram, at least whether communication is allowed,
wherein, in response to detecting, by a report from a base station, that the S-cell is established, the established S-cell is activated, or scheduling of the activated S-cell is enabled, the antenna-pictogram display unit is configured to start displaying an indication that the CA is allowed together with at least one antenna pictogram.

2. The user equipment according to claim 1, wherein the processor is further configured to implement a quality measurement unit that measures reception quality for each of a plurality of cells for which the CA is allowed,
wherein, when the CA is allowed, the antenna pictogram display unit is configured to display, for each of the plurality of cells, the antenna pictogram and a reception level.

3. The user equipment according to claim 1,
wherein, when the CA is allowed, the antenna pictogram display unit is configured to display the one antenna pictogram and a number of carriers with which the CA is allowed.

4. An antenna pictogram display method that is to be executed by user equipment configured to execute communication through a plurality of carriers by executing carrier aggregation, CA, including a primary cell, P-cell, and one or more secondary cells, S-cell, the method comprising:
a step to start displaying, in response to detecting, by a report from a base station, that the S-cell is established, the established S-cell is activated, or scheduling of the activated S-cell is enabled, an indication that the CA is allowed together with at least one antenna pictogram.

* * * * *